Jan. 10, 1956 A. FRÖBEL 2,729,986
ADJUSTABLE STOP MECHANISM
Filed Oct. 17, 1952

INVENTOR
Arthur Fröbel
BY Pierce, Scheffler & Parker
ATTORNEYS

United States Patent Office 2,729,986
Patented Jan. 10, 1956

2,729,986
ADJUSTABLE STOP MECHANISM

Arthur Fröbel, Oberndorf (Neckar), Germany, assignor to Olympia Werke Aktiengesellschaft, Wilhelmshaven, Germany, a corporation of Germany Application October 17, 1952, Serial No. 315,400

Claims priority, application Germany October 17, 1951

1 Claim. (Cl. 74—526)

Various types of adjustable stop devices have been used to arrest the movement of machine parts such as the tabulators of calculating and accounting machines. For instance in order to arrest the movement of the paper roll in calculating and accounting machines the stopping points are marked by pins or latches and the rails on which the parts move are equipped with teeth or notches. When friction clips are used, the stop points are marked by special screws, eccentric keys, movable wedges and the like. Such stopping devices must be detailed and precise in design and construction, and generally require special tools for their installation and adjustment.

The purpose of the present invention is to provide a stop mechanism of simple construction which is easy to operate. According to the invention, the mechanism consists of two concentric shell sections which are movable longitudinally relative to each other. At least one of the sections must have one or more friction surfaces which may be either wedge shaped or conical. A soft spring serves to pull the sections together and thus to apply friction pressure on the carrying rail. I prefer a construction in which the two sections are rigid and in which pressure is applied to the rail by means of balls or the like which run in and extend through openings in the inner section.

Figure 2:
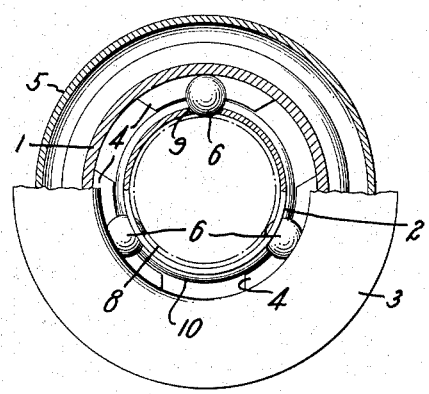
Figure 1:
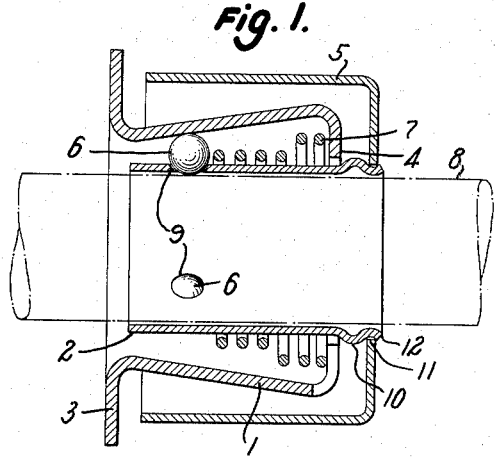
Figure 4:
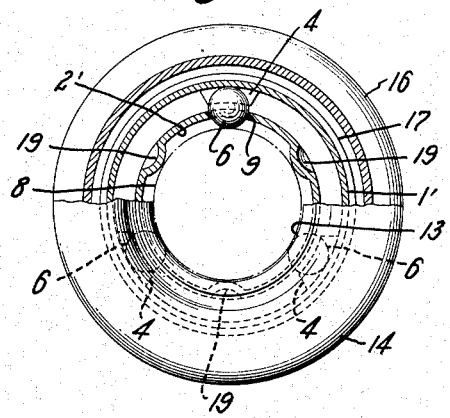
Figure 3:
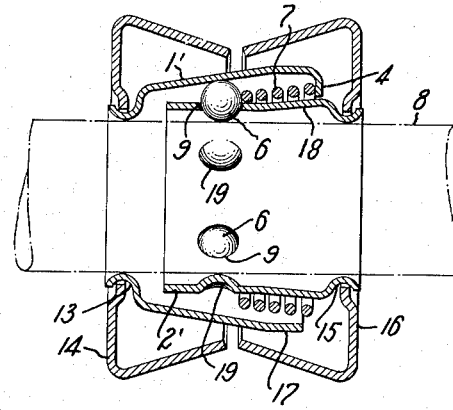

Two embodiments of the invention are illustrated in the accompanying drawings in which:

Fig. 1 is an axial section; and
Fig. 2 is an end view partly in cross-section of one embodiment; and
Fig. 3 is an axial section; and
Fig. 4 is an end view partly in cross-section of a second modification.

Referring to Figs. 1 and 2 of the drawings, the mechanism consists of the outer frusto conical sleeve 1 and the inner cylindrical sleeve 2 which slidably fits the rod or rail 8. The sleeve 2 is provided with equally spaced openings 9 through which the balls 6 may engage the rod 8 and with the ridge 10, groove 11 and ridge 12 which serve to secure the outer shell 5 to the sleeve 2. The sleeve 1 has the flange 3 at one end and three spaced apart inwardly extending fingers 4 at the other end which surround the sleeve 2. The spring 7 occupies the space between the sleeves 1 and 2 and between the balls 6 and the fingers 4 and tends to displace the sleeve 1 to the right as viewed in Fig. 1 with respect to the sleeve 2, and thus by engaging the inclined surface of the sleeve 1 with the balls 6 to press them through the holes 9 into contact with the rod 8. Any force tending to push sleeve 1 to the right or sleeve 2 to the left serves to cause the balls 6 to press against the rod 8 with greater force. To release the mechanism so that it may slide on the rod, the sleeves 1 and 2 must be moved relatively in the opposite direction, e. g. by pulling the sleeve 1 to the left by means of the flange 3 while the sleeve 2 is held stationary or pulled to the right by means of the shell 5. It generally is sufficient, if the mechanism has not gripped the rod too tightly to pull only one of the shells, that is, to pull shell 1 to the left or shell 2 to the right, to release the grip of the balls on the rod. Thus the mechanism can be moved by one hand.

The mechanism of Figs. 3 and 4 is similar in many respects to that of Figs. 1 and 2. It consists of the inner substantially cylindrical sleeve 2' and the outer frusto conical sleeve 1', the balls 6 in the openings 9, the inwardly projecting fingers 4 and the spring 7. However, in place of the flange 3 and the outer shell 5, the sleeve 1' is provided with a groove 13 which supports the shell 14 and sleeve 2' is provided with the groove 15 which supports the shell 16. Shells 14 and 16 are frusto conical in shape with their smaller ends adjacent to each other thus providing a V-shaped notch around the sleeves 1' and 2'. The device may be released from the rod 8 by pulling the shells 14 and 16 in opposite directions, or generally by merely pinching the thumb and a finger of one hand into the V-shaped groove and thus forcing the sleeves 1' and 2' in opposite directions.

It is noted that the sleeve 1' is substantially cylindrical adjacent its larger end at 17 and that the sleeve 2' diverges slightly at 18, this shaping of the sleeves serving to prevent the end of the spring 7 from jumping out of place. This feature may of course be applied to the modification of the mechanism illustrated in Figs. 1 and 2.

The inner sleeve 2' in the modification illustrated in Figs. 3 and 4 is further provided with dome shaped projections 19 which cooperate with the ridge opposite the groove 15 to facilitate the sliding of the sleeve 2' on the rod 8.

It will be evident that various changes may be made in the specific embodiments illustrated without departing from my invention, the scope of which is defined in the appended claim.

I claim:

An adjustable stop mechanism comprising an inner substantially cylindrical sleeve adapted to slide along a relatively stationary cylindrical rod, a shell secured to one end of said sleeve and having a frusto-conical wall spaced apart from and overlying one end of said sleeve with its smaller end adjacent the middle of said sleeve, an outer frusto-conical sleeve concentric with and spaced apart from said inner sleeve with its larger end extending between said inner sleeve and said shell, the larger end of said outer sleeve having at least three projections extending inwardly to sliding contact with said inner sleeve, a shell secured to the smaller end of said outer sleeve and having a frusto-conical wall spaced apart from and overlying the smaller end of said outer sleeve with its smaller end adjacent the middle of said inner sleeve, the smaller end of said outer sleeve projecting beyond the adjacent end of the inner sleeve and being of the same diameter as the diameter of the inner sleeve, at least two spaced apart openings in said inner sleeve between the ends of said outer sleeve, a ball positioned in each of said openings, said balls being of such size as to extend only partly through said openings and to engage said outer sleeve, and a coiled spring positioned in the space between said sleeves and compressed between said projections and said balls thereby tending to move said outer and inner sleeves endwise with respect to each other and thus to press said balls through said openings into engagement with said rod.

References Cited in the file of this patent

UNITED STATES PATENTS

| | | |
|---|---|---|
| 1,439,852 | Tunnell | Dec. 22, 1922 |
| 1,472,854 | Schneider | Nov. 6, 1923 |
| 1,869,790 | Wolf | Aug. 2, 1932 |
| 2,407,837 | Kissel | Sept. 17, 1946 |
| 2,528,002 | Katzberg | Oct. 31, 1950 |